United States Patent [19]

Grassberger et al.

[11] Patent Number: 5,018,553
[45] Date of Patent: May 28, 1991

[54] SINGLE-HANDLE MIXER VALVE WITH A BALL-TYPE VALVING MEMBER

[75] Inventors: Roland Grassberger, Brussels, Belgium; Alfons Knapp, Biberach an der Riss, Fed. Rep. of Germany

[73] Assignee: Masco GmbH, Sandhausen, Fed. Rep. of Germany

[21] Appl. No.: 580,873

[22] Filed: Sep. 11, 1990

[30] Foreign Application Priority Data

Sep. 22, 1989 [IT] Italy ..................... 67785 A/89

[51] Int. Cl.⁵ .......................................... F16K 11/087
[52] U.S. Cl. .............................. 137/625.41; 137/625.4
[58] Field of Search ............ 137/625.4, 625.41, 625.17

[56] References Cited

U.S. PATENT DOCUMENTS

| | | | |
|---|---|---|---|
| 1,478,688 | 12/1923 | Whidden | 137/625.41 X |
| 2,911,009 | 11/1959 | Parker | 137/625.41 |
| 3,417,783 | 12/1968 | Manoogian | 137/625.41 |
| 3,882,897 | 5/1975 | Manoogian et al. | 137/625.4 |
| 3,915,195 | 10/1975 | Manoogian et al. | 137/625.41 |
| 4,043,359 | 8/1977 | Christo | 137/625.41 |
| 4,352,369 | 10/1982 | Lorch | 137/625.41 X |
| 4,449,551 | 5/1984 | Lorch | 137/625.41 |
| 4,662,388 | 5/1987 | Eaton et al. | 137/625.41 X |
| 4,672,999 | 6/1987 | Knapp | 137/625.4 |
| 4,696,322 | 9/1987 | Knapp et al. | 137/625.41 X |

*Primary Examiner*—John Rivell
*Attorney, Agent, or Firm*—Young & Thompson

[57] ABSTRACT

A mixer valve with a ball-type valving member provided with a control member for being displaced in rotation around two different axes, and provided with openings cooperating with inlet openings for hot and cold water, having tubular gaskets of elastomeric material, and with outlet openings for mixed water, provided in a partially spherical seat of a fixed member, in order to regulate the mixing ratio between hot and cold water and the flow of delivered mixed water, wherein there are provided two inlet openings with tubular gaskets for an incoming flow (of cold or hot water), and one inlet opening with tubular gasket for the other incoming flow. These three inlet openings provided with tubular gaskets are at least approximately aligned along a circle within the partially spherical seat of the fixed member of the valve. For inlet of water, in the ball valving member there is provided an opening, elongated on the whole, whose extension at least approximately corresponds to the total extension of two subsequent inlet openings, including the distance which separates the same.

10 Claims, 2 Drawing Sheets

SINGLE-HANDLE MIXER VALVE WITH A BALL-TYPE VALVING MEMBER

DESCRIPTION

BACKGROUND OF THE INVENTION

This invention concerns a mixer valve with a ball-type valving member provided with a control member for being displaced in rotation around two different axes, and provided with openings cooperating with inlet openings for hot and cold water, having tubular gaskets of elastomeric material, and with outlet openings for mixed water, provided in a partially spherical seat of a fixed member, in order to regulate the mixing ratio between hot and cold water and the flow of delivered mixed water.

The mixer valves of the mentioned type are popular because they offer different advantages, however they also have some disadvantages which result particularly from the relatively reduced useful diameter of the tubular gaskets of elastomeric material, through which enter the hot and the cold water. The limit to this useful diameter is mainly due to the limit to the allowable diameter of the ball valving member. More particularly, such valves have a limited flow, an excessively reduced socalled "comfort zone", namely the length of the control member stroke which corresponds to the more frequent controls, and a relatively high noise at the larger flows. Of course, the mentioned disadvantages could be reduced by using a larger useful diameter for the tubular gaskets, but it is not possible to increase said diameter beyond certain limits, on one hand because, for reasons of space, this would require an increase in the diameter of the ball valving member, and therefore of the entire valve, and on the other hand because beyond a certain size the gaskets of elastomeric material could lose their stability and would require to be pressed against the ball valving member by an excessively high force, which would cause friction and other disadvantages.

BRIEF SUMMARY OF THE INVENTION

The main object of this invention is to improve the valves of the mentioned kind in order to ameliorate their performances from the point of view of the delivered flow, without introducing other disadvantages or increasing the diameter of the ball valving member.

Another object of this invention is to improve the valves of the mentioned kind in order to ameliorate their performances from the point of view of the length of the comfort zone, without introducing other disadvantages or increasing the diameter of the ball valving member.

A further object of this invention is to improve the valves of the mentioned kind in order to ameliorate their performances from the point of view of the noise, without introducing other disadvantages or increasing the diameter of the ball valving member.

These objects are attained, according to this invention, in a valve of the mentioned type, in that: there are provided two inlet openings with tubular gaskets for a first flow of the two incoming flows of cold and hot water, and one inlet opening with tubular gasket for the second flow of said two incoming water flows, said three inlet openings provided with tubular gaskets being at least approximately aligned along a circle within the partially spherical seat of the fixed member of the valve, and that, for the inlet of water, in the ball valving member there is provided an opening, elongated on the whole, whose extension is such as to at least approximately correspond to the total extension of two subsequent inlet openings, including the distance which separates the same.

Thanks to this arrangement, in the open position of the valve and in the conditions of more frequent use at least two inlet openings are made active by making them communicate with the interior of the valving member, and according to the mixing condition chosen said two active inlet openings may be, in two characteristic mixing conditions, both inlet openings for the first water flow, or one inlet opening for the first water flow and one inlet opening for the second water flow, whereas in the mixing conditions intermediate the two mentioned ones there is one inlet opening completely active and two adjacent inlet openings partially active. Still complying with the limits imposed to the valve size and the useful diameter of the inlet gaskets, the maximum flow is substantially increased becaused, in the conditions of more frequent use, there are simultaneously active in the whole two inlet openings, instead of one single opening or two only partially active openings, as it happens in the known valves; from this fact it also results a reduction in the velocity with which the water flows enter the valving member, and therefore a reduction of the noise at the larger flows. Finally, as three inlet openings are available, instead of only two as in the known valves, it is possible to dispose these openings along the circle, on which they are at least approximately aligned, in such a way as to comprise a considerably extended angle. It ensures a substantially larger extension of the angle along which the valving member should be displaced in order to change the mixing ratio, and therefore a larger extension of the comfort zone of the valve.

Preferably, said opening elongated on the whole of the valving member is subdivided in a number of aligned portions, separated by bridges. Thanks to this arrangement it is prevented any possibility that the tubular gaskets of the inlet openings are pushed by the pressure into the opening of the valving member, or they are deteriorated during the valve operation by the edges of that opening.

BRIEF DESCRIPTION OF THE DRAWINGS

These and other features and advantages of the subject of the invention will appear more clearly from the following description of an embodiment, having the character of a non-limiting example, diagrammatically shown in the appended drawings, wherein.

DETAILED DESCRIPTION OF THE PREFERRED EMBODIMENTS

Figure 1:
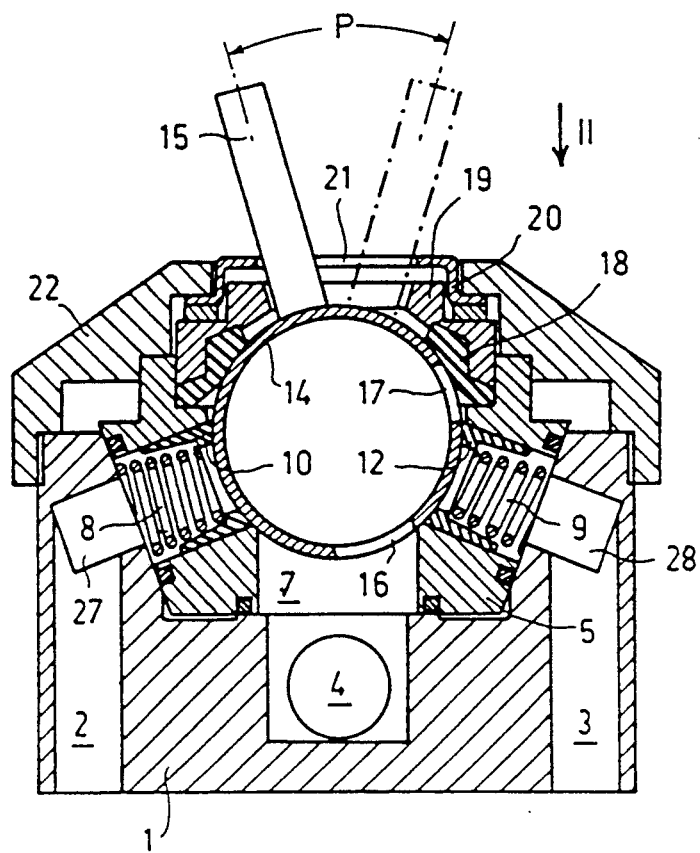
FIG. 1 shows an axial section of a valve embodying the invention, taken along the broken line I—I of FIG. 2.
Figure 4:
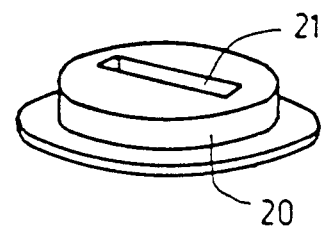
FIG. 4 shows a guide member for the ball valving member being a part of the valve according to FIG. 1.

With reference at first to FIGS. 1 to 4, in a possible embodiment a valve with ball valving member includes a body 1 in which there are passages 2 and 3 for inlet of cold and hot water, and a passage 4 for delivery of mixed water. In a suitable seat of body 1 there is inserted an auxiliary member 5 (provided with gaskets for sealing with respect to body 1), which forms a partially spherical seat 6 for a ball-type valving member, a passageway 7 for the mixed water, which communicates with the delivery passage 4 of a body 1, and inlet openings, communicating with the passages 2 and 3 of body 1, for the cold and hot water. Within said inlet openings there are inserted tubular gaskets of elastomeric material, respectively 10, 11 and 12, and each of them is pushed towards the interior of the partially spherical seat by its own spring; two of these springs, 8 and 9, and shown in FIG. 1.

Figure 3:
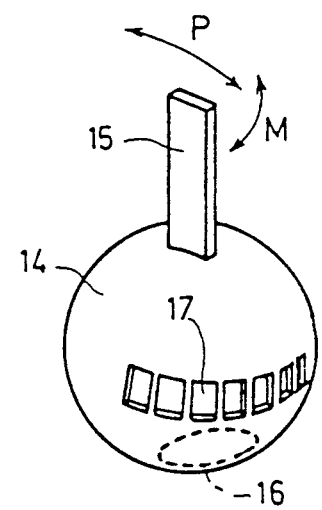
FIG. 3 shows separately the ball valving member for the valve shown in FIG. 1.

The valving member for this valve is shown in more detail in FIG. 3, and it includes a spherical body 14 having a tang 15, usually connected to a control lever (not shown) which allows displacing the valving member around two axes, namely according to arrow P of FIGS. 1 and 3 (in order to regulate the delivery flow) and around the axis of tang 15, according to arrow M of FIG. 3 (in order to regulate the mixing ratio). The spherical body 14 has an outlet opening 16 communicating with the passageway 7 for mixed water, and an opening 17, elongated on the whole, by means of which the valving member cooperates with the tubular gaskets 10-12 of the inlet openings. The valving member 14 is kept within the partially spherical seat 6 by a retaining member 19 with an interposed packing 18, and tang 15 is guided in a slit 21 of a guide member 20, rotatably mounted onto the retaining member 19. The descripted parts are assembled to the valve body 1 by a cover 22 screwed onto body 1.

The task of the auxiliary member 5 is to make easier the machining of the inlet openings. In effect, should member 5 be integral with body 1, it would be necessary to machine said openings from the interior, and this would not be possible with usual machining means in view of the position of these openings. On the contrary, in the auxiliary member 5 the openings may be machined from the exterior without any difficulty. Moreover, whilst the valve body 1 is usually made of brass, the auxiliary member 5 may be made of plastics. When it is suitably shaped, the auxiliary member 5 may have the character of a cartridge.

Figure 2:
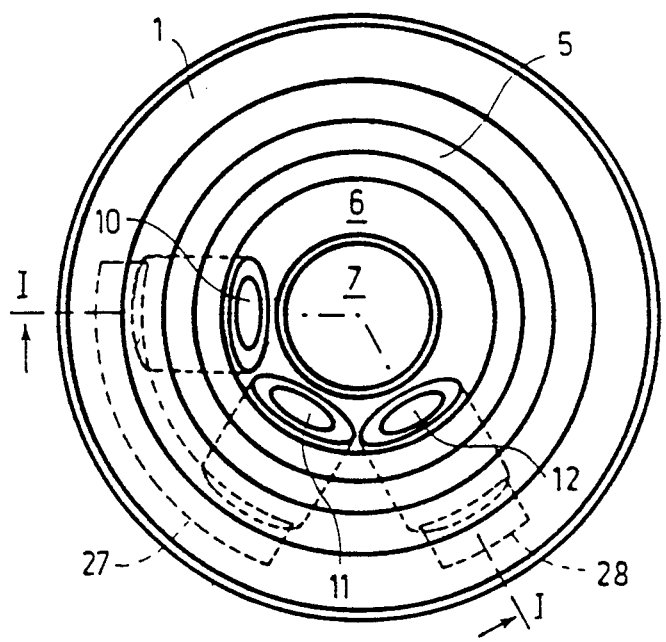
FIG. 2 is a plan view, as seen according to arrow II of FIG. 1, of the partially spherical seat of the valve and the respective parts, after removal of the ball valving member and other components.

As it may be seen from FIG. 2, the inlet openings containing the tubular gaskets 10-12 are arranged in alignment around the partially spherical seat 6. Two inlet openings, 10 and 11, communicate with passage 2 for cold water through a peripheral passage 27, whereas the other inlet opening 12 communicates with passage 3 for hot water through a peripheral passage 28. As it may be remarked, the total extension of the elongated opening 17 of the valving member is such that, in the open position (which is obtained by tilting towards the right, according to FIG. 1, the tang 15) and in the more frequent conditions of use, it always corresponds to two subsequent inlet openings, which may be both openings 10 and 11 when cold water is to be delivered, or the openings 11 and 12 when warm water is to be delivered. Therefore, although the tubular gaskets 10-12 have usual size, the maximum flow allowed is very larger, because (in the more common opening conditions of the valve) there are always two subsequent inlet openings in activity. From this fact ensue the already state advantages.

Figure 5:
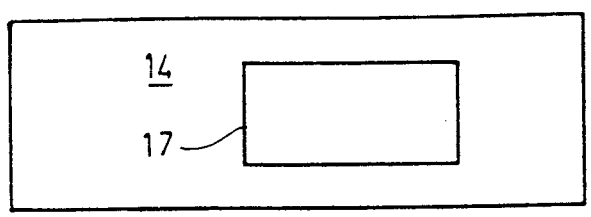
FIGS. 5 to 11 are diagrammatic representations of the mixing process which takes place within the described mixing valve.
Figure 6:
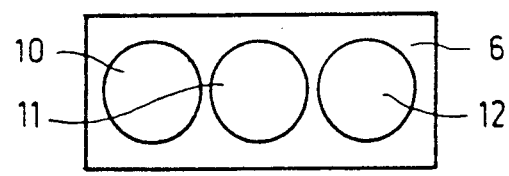

The progress of the mixing process with increasing displacement of the valving member from the position of delivery of cold water only towards the position of delivery of hot water only is diagrammatically shown in FIGS. 5 to 11. FIG. 5 represents, developed on a plane, the whole outline of the passage opening 17 of valving member 14, and FIG. 6 represents, developed on a plane, the arrangement of the inlet openings 10 to 12, among which, in the described embodiment, openings 10 and 11 lead cold water, whilst opening 12 leads hot water.

Figure 7:
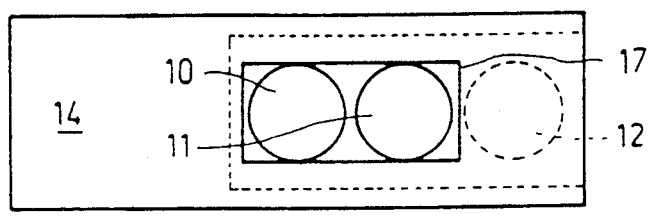

FIG. 7 shows the relative position of the valving member and the passage openings in the condition in which cold water only is delivered. As it may be remarked, in this condition both openings 10 and 11 are uncovered, whilst opening 12 is covered by the valving member. Therefore cold water only is delivered, but the maximum allowable flow is double than that allowed by a usual valve, if the size of the tubular gaskets wherein the water passes is the same.

Figure 8:
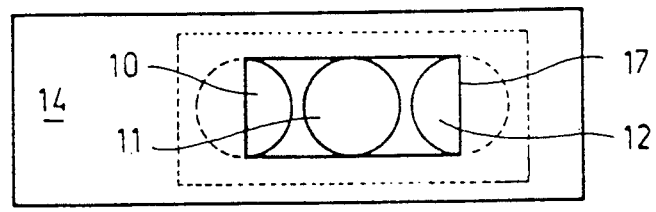

By displacing the valving member by half of the step of the water inlet openings, the condition of FIG. 8 is obtained. In this case opening 11 is completely uncovered, whilst the adjacent openings 10 and 12 are covered by a half. In this manner there is obtained the mixing of a double quantity of cold water with respect to the hot water, whereas the maximum flow allowed remains the same of the foregoing condition.

Figure 9:
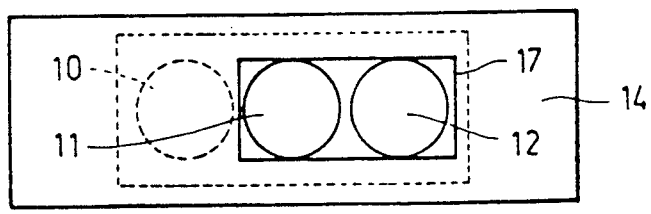

By further displacing the valving member by a half step the position of FIG. 9 is attained, wherein the openings 11 and 12 are uncovered. There is then obtained the mixing of equal proportions of cold and hot water, by always maintaining the same maximum flow allowed by the valve.

It is to be remarked that the conditions considered until now include the conditions of more frequent use, because they correspond to the delivery of water from cold to moderately hot, whereas only in particular cases it is needed to deliver very hot water. It is therefore confirmed what has been affirmed in the foregoing, that in the conditions of more frequent use of the valve there are always two inlet openings in activity in the whole.

Figure 10:
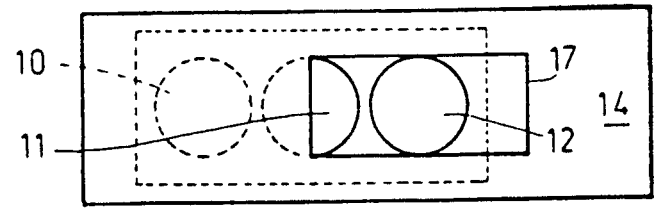

By further proceeding with the displacement of the valving member the field of delivery of very hot water is entered, and the maximum allowed flow becomes more reduced. In effect, as shown by FIG. 10, when the mixing involves one part of cold water for each two parts of hot water, the opening 12 for hot water is completely uncovered, whilst opening 11 for cold water is covered by a half.

Figure 11:
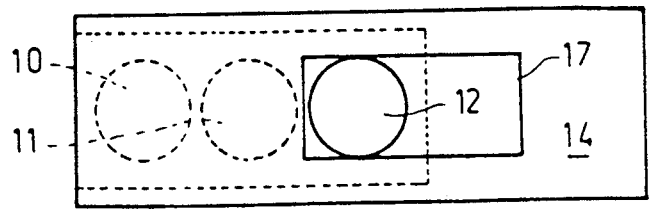

Still further proceeding with the displacement of the valving member it is finally attained the limit condition of FIG. 11, wherein only the opening 12 which leads hot water is uncovered. Water at the maximum available temperature is now delivered, but the maximum flow allowed by the valve now attains a minimum value which corresponds to the flow admitted by a single inlet opening. It is to be remarked, however, that in any event this reduced flow is equal to the maximum flow of a known valve.

Of course, all positions intermediate the described positions are possible, and they give rise to delivery conditions which are also intermediate the considered conditions.

As already stated, although the opening elongated on the wool of the ball valving member 14 may be longitudinally uninterrupted, as diagrammatically shown in FIGS. 5 to 11, it is preferable that said opening is subdivided into relatively small windows. This subdivision may be made in many ways. For example the opening may be subdivided by bridges into several substantially rectangular windows, as shown in FIG. 3; or it may be subdivided by slanting bridges which define substantially rhomboidal windows. It is also possible to chose windows having a curved outline and, moreover, the line along which the windows are aligned is not necessarily rectilinear, as according to FIG. 3; on the contrary, it could be curved, and the windows in which the opening elongated in the whole is subdivided could have different heights. Such design features allow to make the response of the valve the more linear possible, in terms of variations of the temperature of the delivered mixed water with respect to the displacement of the control member.

In the described embodiment there are provided two openings for inlet of cold water and a single opening for inlet of hot water. Such condition meets in a particularly satisfactorily way the more common needs, which include in the more frequent use the delivery of a prevailing quantity of cold water. However in the application of the invention it is also possible to use both coupled openings 10 and 11 for inlet of hot water and the sole opening 12 for inlet of cold water. Such arrangement is particularly suitable for use in combination with an instant water-heater, either electrical or gas feeded, which needs the initial delivery of a relatively high amount of hot water, when the valve is opened, in order to start the water-heater. Even in this case, however, some advantages are attained, namely to allow a larger flow in the intermediate conditions of controls, and to extend the more frequently used field of regulation.

The application of the invention does not require any modification in the structure of the tubular inlet gaskets and their springs, in the guide means for the ball valving member and other parts of the valve, and therefore several parts of the valve according to the invention may be standardized with the corresponding components of valves according to the former art.

In the shown embodiments, the different inlet openings are exactly aligned along a circle on the partially spherical surface of the valve body, however it is to be understood that for the invention it is sufficient that this condition be complied with in an approximate way, and in particular that the level difference among the various openings does not overcome 50% of the useful diameter of the openings. A certain displacement may be of advantage, for example by arranging on a first level the first inlet opening for cold water and the inlet opening for hot water, and on a slightly different level the second inlet opening for cold water, in order to correspondingly extend the length of the control angle relevant for the flow control.

The outlet opening 16 of the ball valving member 14 may be arranged and sized with respect to the corresponding outlet passageway 7 of body 5, in such a way as to reduce (possibly up to close) the passage section when the valve is controlled for delivery of a reduced flow, such as to generate a useful effect of pre-closure, which reduces the noise of the valve and improves the flow control by rendering the same more linear.

In the shown embodiment, a guide member having a slit, cooperating with the tang of the valving member, has been used in order to guide the ball valving member, however it is to be understood that any other guide means may be used for the ball valving member. Moreover, all components and arrangements described may be replaced by technically equivalent means.

We claim:

1. In a mixer valve comprising: a fixed part having a partially spherical seat; inlet openings for incoming flows of hot and cold water and at least one outlet opening for mixed water, said openings being disposed at a certain mutual distance and communicating with said partially spherical seat; a ball-type valving mounted in said partially spherical seat of the fixed part, said valving member having a control member for being displaced in rotation around two different axes, and having openings intended for cooperating with said inlet openings and outlet opening in order to regulate the mixing ratio between hot and cold water and the flow of delivered mixed water; and tubular gaskets of elastomeric material inserted in said inlet openings, the improvements; that said inlet openings with tubular gaskets include two inlet openings for a first flow of said two incoming flows of cold and hot water, and one inlet opening with tubular gasket for the second flow of said two incoming water flows, said three inlet openings wherein tubular gaskets are inserted being at least approximately aligned along a circle within said partially spherical seat of the fixed part of the valve; and that said opening of the ball valving member, intended for cooperating with said inlet openings, is elongated on the whole, and has an extension such as to at least approximately correspond to the total extension of two subsequent inlet openings, including the distance which separates the same.

2. A mixer valve as set forth in claim 1, wherein all said inlet openings are aligned on a circle in said partially spherical seat of the fixed part of the valve.

3. A mixer valve as set forth in claim 1, wherein said inlet openings are arranged near a circle in said partially spherical seat of the fixed part of the valve, and their mutual level differences with respect to said circle do not overcome 50% of the useful diameter of the tubular gaskets inserted into said openings.

4. A mixer valve as set forth in claim 1, wherein said opening elongated on the whole, formed in the ball valving member, is uninterrupted.

5. A mixer valve as set forth in claim 1, wherein said ball valving member comprises bridges which subdivide into several partial openings said opening elongated on the whole, formed in the ball valving member.

6. A mixer valve as set forth in claim 1, wherein said opening of the ball valving member, intended to cooperate with said outlet opening of the fixed part of the valve, is arranged and sized in such a way as to reduce the passage section in certain positions of the valve, in order to give rise to a pre-closure effect.

7. A mixer valve as set forth in claim 1, wherein said fixed part of the valve includes a body and an auxiliary member inserted in said body, and said partially spherical seat and inlet openings are formed in said auxiliary member.

8. A mixer valve as set forth in claim 7, wherein said auxiliary member has the character of a cartridge.

9. A mixer valve as set forth in claim 1, wherein said inlet openings include two openings for inlet of cold water and one opening for inlet of hot water.

10. A mixer valve as set forth in claim 1, wherein said inlet openings include two openings for inlet of hot water and one opening for inlet of cold water.

* * * * *